United States Patent [19]

Fukuda et al.

[11] Patent Number: 5,331,494
[45] Date of Patent: Jul. 19, 1994

[54] HEAD CORE SLIDER FOR RIGID MAGNETIC DISK DRIVE

[75] Inventors: Naoya Fukuda, Aichi; Tadashi Sagara; Mitsuaki Ishigaki, both of Nagoya, all of Japan

[73] Assignee: NGK Insulators, Ltd., Japan

[21] Appl. No.: 977,291

[22] Filed: Nov. 16, 1992

[30] Foreign Application Priority Data

Nov. 18, 1991 [JP] Japan .................. 3-329514

[51] Int. Cl.$^5$ .................. G11B 5/187; G11B 5/31; G11B 5/60
[52] U.S. Cl. .................. 360/103; 360/122; 360/125
[58] Field of Search .................. 360/103, 122, 125

[56] References Cited

U.S. PATENT DOCUMENTS

| | | | |
|---|---|---|---|
| 4,811,142 | 3/1989 | Nakashima et al. | 360/103 |
| 5,008,767 | 4/1991 | Iwata et al. | 360/103 |
| 5,072,322 | 12/1991 | Yasar et al. | 360/103 |

FOREIGN PATENT DOCUMENTS

| | | | |
|---|---|---|---|
| 0097975 | 1/1984 | European Pat. Off. | |
| 0361809 | 4/1990 | European Pat. Off. | |
| 1-48217 | 2/1989 | Japan | 360/103 |

OTHER PUBLICATIONS

Patent Abstracts of Japan, vol. 14, No. 173 (P-1033) (4116) Apr. 5, 1990 & JP-A-20 27 506 (Mitsubishi Electric Corp.) Jan. 30, 1990.
Patent Abstracts of Japan, vol. 14, No. 577 (P-1146) Dec. 21, 1990 & JP-A-22 47 816 (NGK Insulators Ltd.) Oct. 3, 1990.

*Primary Examiner*—Robert S. Tupper
*Attorney, Agent, or Firm*—Parkhurst, Wendel & Rossi

[57] ABSTRACT

A head core slider including a slider body having an air bearing, and a head core having a ferrite portion providing a closed magnetic circuit with a magnetic gap is disclosed. The ferrite portion of the head core has a recess formed in at least one of two surface areas thereof which are to face the magentic disk and which are located on opposite sides of the magentic gap.

3 Claims, 6 Drawing Sheets

HEAD CORE SLIDER FOR RIGID MAGNETIC DISK DRIVE

BACKGROUND OF THE INVENTION

1. Field of the Invention

The present invention relates generally to a head core slider for a rigid magnetic disk drive (RDD) and a method of fabricating the same, and more particularly to a technique for reducing or avoiding a noise in the form of abnormal pulses, which may occur during reproduction or reading of recorded signals, particularly in a magnetic recording head for RDD using a ferrite core slider.

2. Discussion of the Prior Art

As one type of head core slider for a rigid magnetic disk drive (RDD), which includes a slider body having air bearings and a head core having a closed magnetic circuit (path) with a magnetic gap, there is known a ferrite core slider for RDD, in which at least a head core portion constituting the closed magentic circuit is formed of a ferrite material.

Various types of ferrite head core sliders have been proposed for use in a magentic head, for improvements in the output, recording density and other characteristics of the magnetic head. For instance, there are proposed a so-called monolithic type core slider, a so-called composite type core slider and a core slider having a MIG (Metal In Gap) structure. In the monolithic type core slider, the whole body of the core slider is formed of ferrite, and a part of the slider body functions to partially define the closed magnetic circuit. In the composite type core slider, the slider body and the head core are prepared independently of each other, and only the head core portion constituting the closed magnetic circuit is formed of a ferrite.

In operation of the RDD magnetic head having the ferrite core slider of any known type, reproduction outputs may include noise in the form of abnormal pulses (which may be called "Wiggle"), upon reproduction of signals recorded on a magnetic disk. Formerly, this abnormal-pulse type noise did not cause any major problem since the noise has a relatively low output level. Up to the present, therefore, the cause for the occurrence of this type of noise has not been made clear nor discovered, let alone a solution to the problem.

In recent years, however, the RDD magnetic head may suffer from increases in the output level and frequency of occurrence of the abnormal-pulse type noise, due to an increased coercivity of a magnetic disk to meet a need for high-density recording, an increased residual magnetic flux density, and a comparatively narrow spacing between the magnetic head and magnetic disk.

SUMMARY OF THE INVENTION

It is therefore a first object of the present invention to provide an improved structure of head core slider for a rigid magnetic disk drive (RDD), capable of reducing or avoiding the above-described noise in the form of abnormal pulses. It is a second object of the invention to provide a method of fabricating such a head core slider.

The first object may be attained according to a first aspect of the present invention, which provides a head core slider for a rigid magnetic disk drive, including a slider body having an air bearing formed on a sliding surface thereof on which a magnetic disk is to slide, and a head core provided adjacent one of lengthwise opposite ends of the air bearing, the head core having a ferrite portion constituting a closed magnetic circuit, and a magnetic gap which intersects the closed magnetic circuit at a point thereof which is to face the magnetic disk, wherein the improvement comprises the ferrite portion of the head core having a recess formed in at least one of two surface areas thereof which are to face the magnetic disk and which are located on opposite sides of the magnetic gap.

In the head core slider for RDD constructed according to the present invention, the abnormal-type noise which may occur upon reproduction of signals recorded on a magnetic disk can be effectively reduced or prevented, while assuring a sufficiently high level of output of the recorded signals on the magnetic disk.

The second object indicated above may be attained according to a second aspect of the invention, which provides a method of fabricating a head core slider for a rigid magnetic disk drive, including a slider body having an air bearing formed on a sliding surface thereof on which a magnetic disk is to slide, and a head core provided adjacent one of lengthwise opposite ends of the air bearing, the head core having a ferrite portion constituting a closed magnetic circuit, and a magnetic gap which intersects the closed magnetic circuit at a point of the circuit which is to face the magnetic disk, the method comprising the step of: forming by etching a recess in at least one of two surface areas of the ferrite portion of the head core which are to face the magnetic disk and which are located on opposite sides of the magentic gap.

When the above-indicated recess is formed by etching according to the method described above, the recess or recesses can be formed with high efficiency, during a series of process steps for producing the core slider, permitting the thus formed recess or recesses to have a desired shape and assuring high accuracy in the dimensions of the recesses.

DETAILED DESCRIPTION OF THE PRESENT INVENTION

Figure 1:
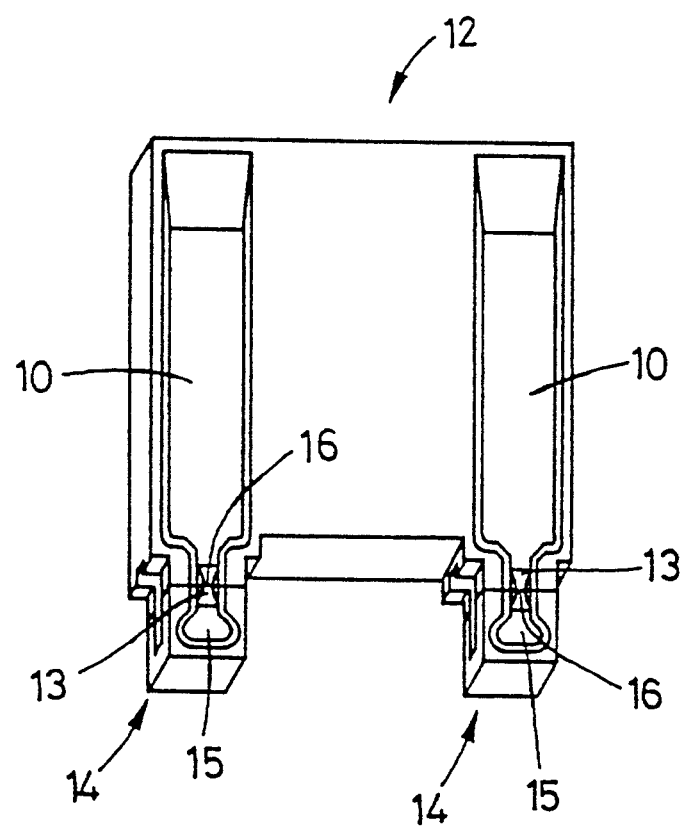
FIG. 1 is a perspective view showing the whole structure of the head core slider for RDD as one embodiment of the present invention.

There will be described a technical advantage of the head core slider constructed according to the present invention, that is, the relevance of the structure of the present head core slider to achievement of the above objects of the invention.

The inventors first effected a signal recording/reproducing test so as to determine whether the cause for the abnormal-pulse type noise which occurs in an RDD magnetic head using a ferrite head core slider is associated with the recording or writing of signals on a magnetic disk, or associated with the reproduction or reading of signals from the disk. This test used a defective magnetic head which generates the abnormal-pulse type noises during a reproducing process, and a non-defective magnetic head which does not generate such a noise. This test was effected by recording a given frequency of signals on the magnetic disk and observing reproduction signals by an oscilloscope.

As a result of the above test, it was recognized that the abnormal-pulse type noise occurred when the recording was effected by the non-defective magnetic head and the reproduction was effected by the defective magnetic head, and that the same type of noise did not occur when the recording was effected by the defective magnetic head and the reproduction was effected by the non-defective magnetic head. Based on these facts, it was presumed that the abnormal-pulse type noise occurred during a signal reproducing process.

It was also recognized that the abnormal-pulse type noise occurred in some cases and did not occur in other cases when the recording and reproduction were repeated, and that when the noise occurred, the position of the abnormal pulses relative to normal main pulses in the reproduction signal waveform and the amplitude of the abnormal pulse did not change unless the magnetic field was applied to the magnetic head, e.g., by applying a recording current. The above-indicated normal main pulses should be interpreted to mean the reproduction signals which have the nominal level and which do not include the abnormal-pulse type noise.

It will be understood from the results of the above test that the abnormal-pulse type noise depends on the state of magnetization of the recording head during its reproducing operation.

To know about the dependence of the position of the abnormal pulses on the main pulses, in other words, the dependence of the abnormal pulses upon the recorded signals, the inventors conducted another test using a plurality of magnetic heads which were adapted to generate the abnormal-pulse type noise. This test was effected by observing by an oscilloscope reproduction signals produced by the respective magnetic heads, to detect the abnormal-pulse type noises which occurred during reproduction of signals of predetermined frequencies (between 62.5 kHz–125 kHz) recorded on magnetic disks. In the test, the recording of the signals on each magnetic disk was effected by another magnetic head which was not adapted to produce the abnormal-pulse type noise, to avoid variation in the state of magnetization of the magnetic heads to be tested.

The test using the oscilloscope indicated some cases wherein the main pulses were generated a predetermined constant time after the generation of the abnormal pulses, irrespective of the predetermined frequency of the recorded signals, namely, the abnormal pulses occurred first when the recorded main pulse signals reached a predetermined position on a track of the head, which is before the magnetic gap in the reproducing direction. In other cases, tests indicated that the main pulses occurred first a predetermined constant time before the generation of the abnormal pulses, irrespective of the predetermined frequency of the recorded signals, namely, the abnormal pulses were generated when the recorded main pulse signals reached a predetermined position on the track of the head, which is ahead of the magnetic gap in the reproducing direction. It will be apparent that in either case the abnormal pulses have positional dependency on the main pulses.

TABLE 1

| Frequency recorded signals | Interval between main and abnormal pulses: 1 ($\mu$m) | Polarity of main pulses | Wavelength of recorded signals: $\lambda$ ($\mu$m) |
|---|---|---|---|
| 125 kHz | 10.5 | + | $\lambda/2 > 10.5$ |
| 200 kHz | 10.5 | | |
| 300 kHz | 10.5 | | |
| 400 kHz | 11.4 | − | $10.5 > \lambda/2 > 5.7$ |
| 500 kHz | 11.4 | | |
| 900 kHz | 10.5 | + | $11.4 > \lambda/2 > 7.0$ |
| 1.2 MHz | 11.4 | − | $10.5 > 3\lambda/2 > 8.6$ |

A similar test was conducted using magnetic disks on which signals having respective frequencies of 125 kHz–1.25 MHz were recorded, so as to determine whether the abnormal pulses have positional dependency on the main pulses even when the recorded signals have a relatively high frequency. In this test, the magnetic head produced the abnormal pulses when the main pulses reached a predetermined position before the magnetic gap. The result of the test is indicated above in TABLE 1.

It will be apparent from the result of the test as shown in TABLE 1 that the positional dependency of the abnormal pulses on the normal main pulses is maintained even when the frequency of the recorded signals is relatively high. It was also found that as the signal frequency increases, the distane or interval "$\lambda/2$" ($\lambda$: wavelength of recorded signals) between the main pulses becomes smaller than the above-indicated interval "a" between the corresponding main pulse and abnormal pulse, with a result that the preceding main pulse precedes the abnormal pulse whose position depends on that of the following main pulse, causing a slight change in the interval "a". As the signal frequency becomes even higher, the two preceding main pulses precede the abnormal pulse whose position depends on the following main pulse, with a result that the interval "a" between the corresponding main pulse and abnormal pulse returns to the original value. Similar phenomena cyclically appear as the signal frequency further increases higher and higher.

It will be understood from the results of the test that the abnormal-pulse type noise produced by the magnetic head has a predetermined positional relationship with the signals recorded on a magnetic disk unless the state of magnetization of the head is changed.

The inventors then assumed that the abnormal-pulse type noise is produced due to magnetic flux leakage from the signals recorded on a magnetic disk, which may affect a given portion (outside the magnetic gap) of the ferrite head core of the magnetic head.

To reduce the influence of the leakage flux on the head core portion outside the magnetic gap, the surface of the ferrite head core of the magnetic head, which is to face a magnetic disk, was subjected to etching, to form a recess at a position on the above surface which is spaced away from the magnetic gap by a distance corresponding to the above-indicated interval "a" between the main pulse and the abnormal pulse which has a positional dependency on that main pulse. The thus obtained magnetic head with the recess formed in the ferrite head core was tested in respect of the abnormal-pulse type noise. The result of the test is indicated below in TABLE 2.

TABLE 2

| Specimen No. | Etching depth (μm) | Abnormal pulse output × 100 (%) Main pulse output |
|---|---|---|
| 1 | 0 | 4.6 |
|  | 0.18 | 4.2 |
|  | 0.38 | 1.9 |
| 2 | 0 | 10.9 |
|  | 0.14 | 10.2 |
|  | 0.31 | 5.1 |

As is apparent from TABLE 2, the inventors found that the abnormal-pulse type noise can be reduced by forming a recess in a surface area in the vicinity of the magnetic gap on the surface of the magnetic head which is to face the magnetic disk, and thereby providing an increased spacing between the opposed surfaces of the magnetic disk and head. It was also found that the ratio of the output level of the abnormal pulse to that of the main pulse is reduced with an increase in the depth of the recess formed by etching.

Figure 5:
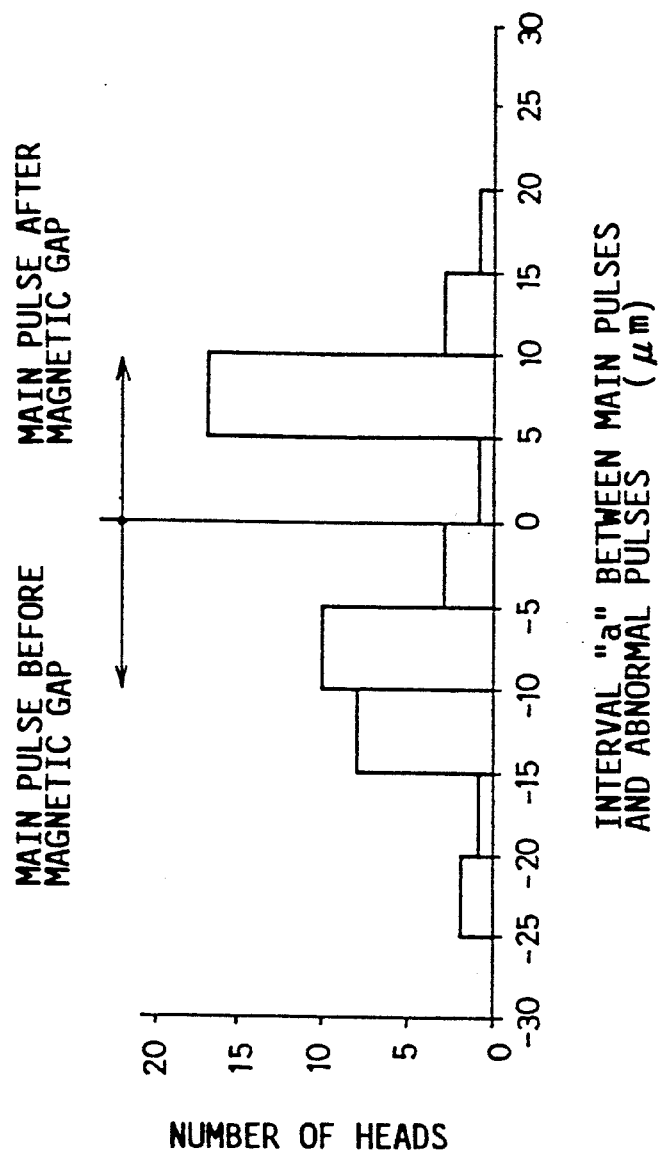
FIG. 5 is a graph indicating the result of measurement upon many magnetic heads, for an interval between a main pulse as a reproduce output, and an abnormal pulse having a positional dependency on the main pulse.

To achieve reduction of the abnormal-pulse type noise in a general magnetic head for RDD on the basis of the above findings, the interval "a" between main pulses and abnormal pulses having mutual positional dependency was measured with respect to 46 RDD magnetic heads, so as to determine the position(s) where the recess(es) should be formed in the head. The result of the measurement is indicated in the graph of FIG. 5. The measurement was conducted with respect to 46 monolithic type magnetic heads, which were produced under the same conditions.

It was recognized from the measurement result that a point on the opposed surface of the magnetic head, which causes the abnormal-pulse type noise, is in the neighborhood of the magnetic gap. It was also recognized that such a point or points causing the noise may be present on either side of the magnetic gap, or on both sides of the gap, as viewed in the rotating direction of the magnetic disk.

To reduce the abnormal-pulse type noise, therefore, it is necessary to form the above-indicated recess in a surface area or areas of the head which include(s) the magnetic gap and its vicinity. More specifically, it is effective to form the recess(es) in part or entirely over a distance of 40 μm as measured from the magnetic gap, in the rotating direction of the disk. In this regard, the recess must not be formed to extend over a portion of the ferrite head core which defines the magnetic gap, since the output level of recorded signals when reproduced are undesirably reduced if the recess extends over the gap-defining portion. In view of a problem concerning the machining accuracy, the recess(es) is/are usually formed such that one of the opposite ends of each recess which is adjacent to the gap is located at least 0.5 μm away from an end face of the ferrite core which defines the magnetic gap.

In some cases, the point of the head causing the abnormal-pulse type noise is present on only one side of the magnetic gap, due to the shape or process of fabricating the magnetic head. The present inventors confirmed that in such cases the abnormal-pulse type noise can be effectively reduced by forming the recess on only the above-indicated one side of the magnetic gap.

Figure 6:
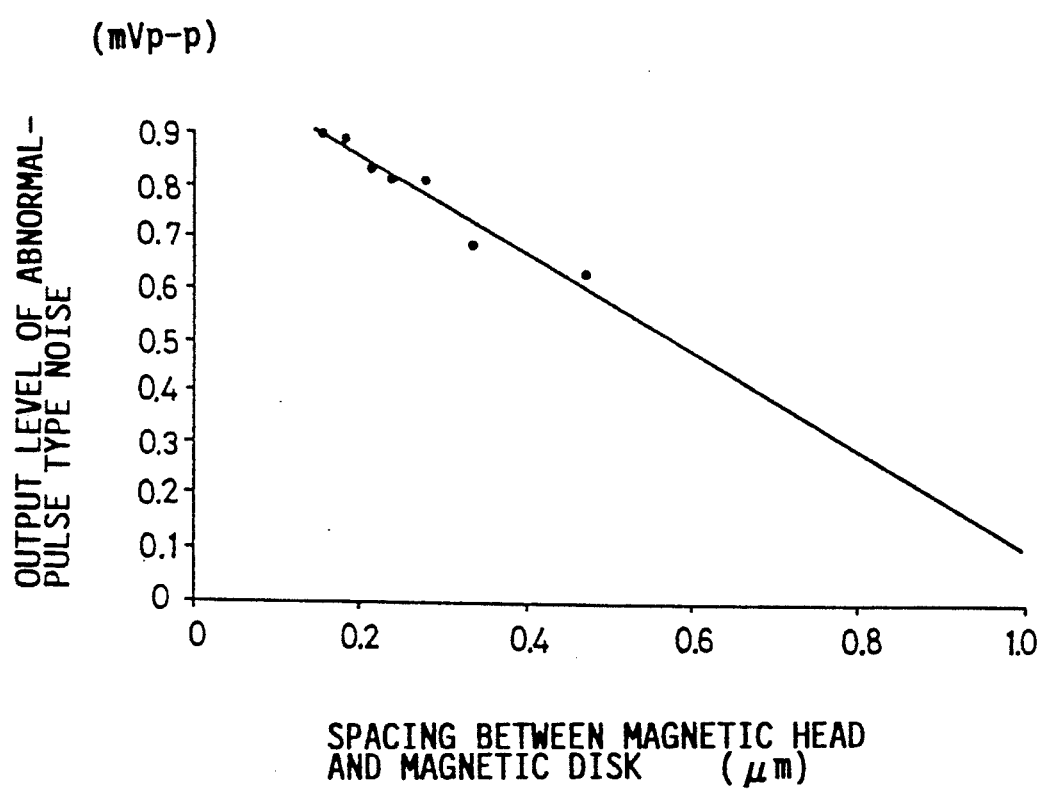
FIG. 6 is a graph indicating the result of measurement of the output level of the abnormal noise which varies depending upon a spacing between a magnetic head and a magnetic disk.

In the next step, the inventors measured the output level of the abnormal-pulse type noise, which varied depending upon the distance or spacing between the magnetic head and a magnetic disk, so as to determine the effective depth of the recess for reducing the abnormal-pulse type noise. The result of the measurement is indicated in FIG. 6. This measurement was effected using a monolithic type magnetic head.

It will be apparent from the measurement result that the abnormal-pulse type noise can be effectively reduced merely by spacing the magnetic head slightly away from the magnetic disk, and that the noise can be almost eliminated by spacing the magnetic head 1 μm or more away from the magnetic disk.

It will be understood from the result of this measurement and TABLE 2 indicated above that the recess formed in a local part or parts of the sliding surface of the ferrite core of the head may have a considerably small depth, e.g., about 0.1 μm, so as to effectively reduce the abnormal-pulse type noise. It is nonetheless preferable to form a recess or recesses having a depth of 0.5 μm to 2 μm or more, in view of the effect of reducing the noise and ease of forming the recess(es).

Upon measurement for the relationship between the depth of the recess and the effect of reducing the noise as described above, the etching depth of the recess was not actually measured in relation to the output level of the abnormal-pulse type noise, since the characteristics of the magnetic head may be possibly changed with variation in the etching depth of the recess. Namely, the thus obtained result of the measurement does not accurately indicate the relationship between the depth of the recess and the effect of reducing the noise.

While the recess as described above may be formed by machining, the recess is advantageously formed by an etching technique such as wet etching, dry etching or laser-induced etching (laser irradiation in a reacting liquid or gas).

For instance, a resist is first patterned on a ferrite core slider of a magnetic head for RDD produced according to a known method, to cover the ferrite core except its surface area or areas in which the recess or recesses is/are to be formed. Thereafter, the ferrite core is etched to a suitable depth in an aqueous solution of phosphoric acid, for example, and the resist is then removed, to thereby form the recess(es) in the ferrite core of the head.

Alternatively, the recess(es) may be formed in the ferrite core by photoetching, while the above-indicated air bearings are formed by etching during fabrication of the ferrite core slider for RDD.

Further, the recess is desirably formed such that its end wall does not extend in parallel with the magnetic gap of the ferrite core slider, i.e., in the direction of width of the magnetic gap perpendicular to the rotating direction of the magnetic disk.

Figure 7:
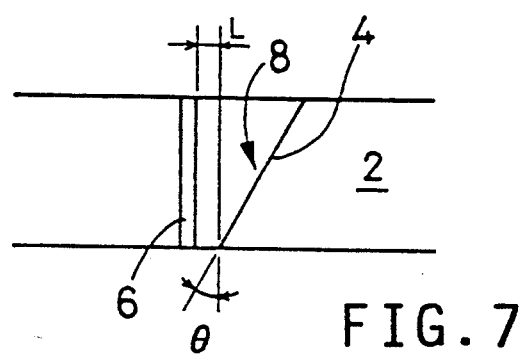
FIG. 7 is a plan view of an enlarged portion of the core slider, which shows one example of the shape of an end wall of the recess formed according to the present invention.

More specifically described referring to a plan view of FIG. 7 which schematically shows the surface of the ferrite core slider that is to face the magnetic disk, a recess 2 is formed such that its end wall 4 is inclined a suitable angle θ with respect to a magnetic gap 6, in the plane of the above surface of the core slider. The above angle θ is preferably held in a range of 5°~45° so as to effectively yield an advantage as will be described below.

Figure 8:
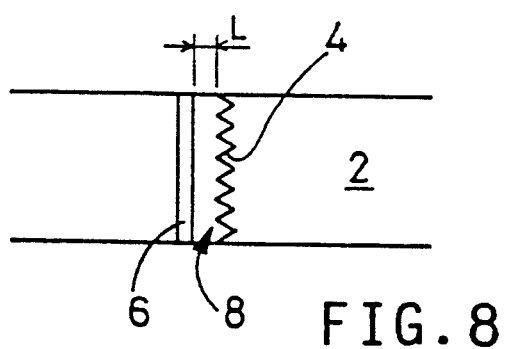
FIG. 8 is a plan view of an enlarged portion of the core slider, which shows another example of the shape of an end wall of the recess formed according to the present invention.

Alternatively, the end wall 4 of the recess 2 may be formed to provide a corrugated edge which extends generally in the direction of width of the magnetic gap 6, as shown in FIG. 8. For instance, the corrugated edge 4 is formed by first forming the recess 2 having an end wall which extends in parallel with the magnetic gap 6, patterning a resist on the surface area adjacent the end wall, and then etching the appropriate area to provide a suitable corrugation thereon.

With the end wall 4 of the recess 2 formed so as not to extend in parallel with the magnetic gap 6, it is possible to alleviate or avoid a rapid change in the magnetic flux received by the magnetic head, which would otherwise occur at an edge portion 8 (FIGS. 7 and 8) of the ferrite core which defines the appropriate end of the recess 2. Consequently, a so-called edge noise which is an output change as a result of the magnetic flux change can be effectively avoided.

Since the magnetic head may suffer from the edge noise when the depth of the recess 2 is 1 $\mu$m or more, the end wall 4 is advantageously formed so as not to extend in parallel with the magnetic gap 6.

When the recess 2 is formed by etching as described above, the end wall 4 of the recess 2 may be also inclined relative to the plane parallel to the direction of thickness thereof, leading to a further increased effect of alleviating or avoiding the edge noise. In this regard, the angle of inclination of the end wall 4 of the recess 2 can be controlled to a desired value by suitably selecting the crystal orientation of the ferrite of the head core, and etching conditions such as the temperature and concentration of an etchant.

When the recess 2 is formed such that its end wall 4 does not extend in parallel to the magnetic gap 6, it is desirable that a distance "L" between a point on the end wall 4 which is closest to the magnetic gap 6 and the appropriate end face of the head core defining the gap 6 is set within a range of 0.5 $\mu$m$<$L$\leq$40 $\mu$m, so as to effectively reduce the abnormal-pulse type noise.

DETAILED DESCRIPTION OF PREFERRED EMBODIMENT

Referring to FIG. 1 which shows a monolithic type magnetic head core slider for RDD as one embodiment of the present invention, a slider body 12 made of ferrite cooperates with integrally formed C-shaped yoke portions 14, 14 made of ferrite, to constitute a closed magnetic circuit of a head core of the core slider.

Figure 2:
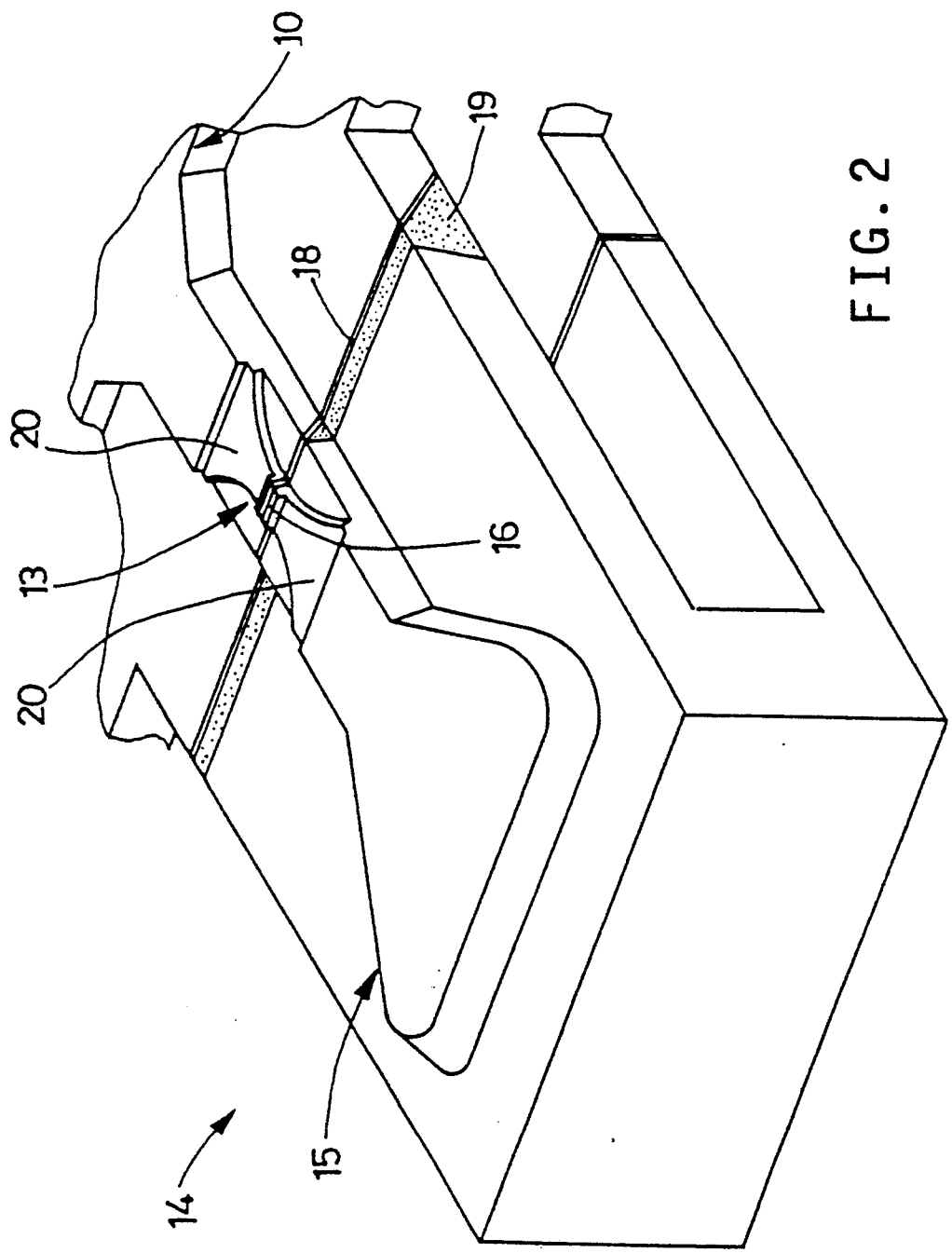
FIG. 2 is a perspective view showing in enlargement a portion of the head core slider of FIG. 1, which defines a magnetic gap.

The instant magnetic head core slider may be fabricated according to a known method. Namely, a first ferrite block which gives the slider body 12 and a second ferrite block which gives the yoke portion 14 are butted and bonded together, to thereby provide an annular closed magnetic circuit (head core), and a magnetic gap 16 which is defined between the opposed surfaces of the butted first and second ferrite blocks. Thereafter, a pair of parallel air bearings 10, 10 are formed by photoetching on the top surface of the slider body 12. Each of the right and left air bearing 10 is formed integrally with a narrow track portion 13 having the magnetic gap 16 at its middle part, and a projection 15 whose width is larger than that of the track portion 13 but smaller than that of the air bearing 10, such that these portions 10, 13 and 15 extend in the direction from the slider body 12 to the yoke portion 14 on a sliding surface of the core slider on which the magnetic disk slides in operation. In FIG. 2, reference numeral 19 denotes a filler made of glass, for example.

Figure 3:
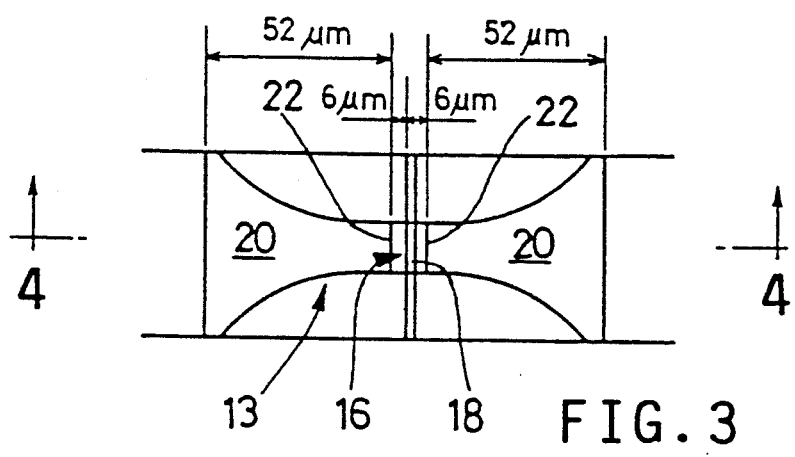
FIG. 3 is a plan view showing in enlargement a portion of the head core slider of FIG. 1, which defines a magnetic gap.
Figure 4:
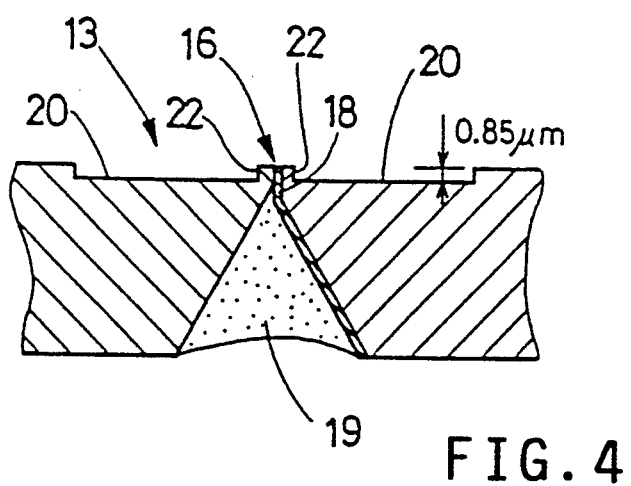
FIG. 4 is a cross sectional view taken along line 4—4 of FIG. 3.

In the magnetic head core slider of the instant embodiment, the track portion 13 defining the magnetic gap 16 is subjected to laser etching, as shown in enlargement in FIGS. 2 and 3, so that widthwise opposite grooves are formed in the track portion 13 so as to define the width of the magnetic gap 16. In the magnetic head core of the instant core slider, the magnetic gap 16 has a size of 0.46 $\mu$m while a 2 $\mu$m-thickness metal layer 18 made of Sendust is formed on the end face of the slider body 12 which partially defines the magnetic gap 16. Thus, the instant magnetic head core has a so-called MIG (Metal-In-Gap) structure.

To evaluate the effect of reducing the abnormal-pulse type noise as a result of formation of recesses near the magnetic gap according to the present invention, a magnetic head (coil winding: 16 turn bifilar) was produced as a comparative example, using a magnetic head core slider of a known structure, for measurement of the output level of the abnormal-pulse type noise which occurred in this magnetic head. After the measurement, recesses were formed in a subsequent step in the thus produced magnetic head core slider.

Namely, the recesses were formed in the magnetic head core slider constructed as described above, which used to make the abnormal-pulse type noise upon reproduction of recorded signals on a magnetic disk. More specifically, the track portion 13 was wet-etched by a photoetching technique, to form two recesses 20 in respective surface areas on the opposite sides of the magnetic gap 16, each of which is spaced 6 $\mu$m away from the center of the gap 16. The thus formed recesses 20 have a width of 52 $\mu$m and a depth of 0.85 $\mu$m. In the instant embodiment, the recesses 20, 20 have respective end walls 22, 22 which extend in the direction of width of the track portion 13 in substantially parallel with the magnetic gap 16.

With respect to the magnetic head (coil winding: 16 turn bifilar) using the thus obtained core slider, the output level of the abnormal-pulse type noise which occurred in the head was measured under the same conditions as in the above measurement for the magnetic head using the core slider with no recess formed therein, so as to evaluate the effect of reducing the noise by comparing the output characteristics before and after the recesses were formed in the head core.

The measurement of the output level of the abnormal-pulse type noise which occurred in the above magnetic heads was effected using a magnetic disk for RDD having a coercivity of 1200 Oe. Prior to the measurement, a signal (main pulse) of 125 kHz was recorded on this magnetic disk at a point of R=1.0 inch while the disk was rotated at the rate of 3600 rpm, by applying a recording current of 30 mA$_{0-p}$ by means of a magnetic head producing no abnormal-pulse type noise. The magnetic gap of each of the magnetic heads to be tested was 0.16 $\mu$m away from the magnetic disk while the disk flew over the head upon reproduction of the recorded signal. The result of this measurement is indicated below in TABLE 3.

TABLE 3

| Main pulse output (mV$_{0-p}$) | Abnormal pulse output $\times$ 100 (%) Main pulse output |
|---|---|
| *1  18.5 | 2.1 |

TABLE 3-continued

| | Main pulse output (mV$_{0-p}$) | Abnormal pulse output × 100 (%) Main pulse output |
|---|---|---|
| *2 | 18.6 | 10.4 |

*1: Present embodiment
*2: Comparative example

It is apparent from the result of the measurement as indicated in TABLE 3 that the instant magnetic head core slider with the recesses 20, 20 achieved considerable reduction in the output of the abnormal pulse without incurring reduction in the output of the main pulse.

While the present invention has been described in its presently preferred embodiment, for illustrative purpose only, it is to be understood that the invention is not limited to the details of the illustrated embodiment, but may be embodied with various changes, modifications and improvements, which may occur to those skilled in the art.

While the present invention is applied to the compolithic type core slider for RDD having the so-called MIG structure in the illustrated embodiment, the invention is similarly applicable to the same type of core slider which is not of MIG structure, or to RDD core sliders of a monolithic type and a composite type.

Further, the recesses 20 formed near the magnetic gap 6 may be filled with a non-magnetic material such as glass.

What is claimed is:

1. A head core slider for a rigid magnetic disk drive, including a slider body having at least one longitudinal air bearing rail formed on an upper surface thereof which faces a magnetic disk during operation of the disk drive, and a head core provided adjacent one of lengthwise opposite ends of said at least one air bearing rail, said head core having a ferrite portion constituting a closed magnetic circuit, and a magnetic gap which intersects said closed magnetic circuit at a point thereof which is to face the magnetic disk, said magnetic gap extending perpendicular to the longitudinal direction of said at least one air bearing rail, wherein the improvement comprises:

said ferrite portion of said head core having a recess formed in at least one of two surface areas thereof which are to face the magentic disk and which are located on opposite sides of said magnetic gap in the longitudinal direction of said at least one air bearing rail;

wherein (i) the width of said recess, measured in a direction perpendicular to the longitudinal direction of said at least one air bearing rial, is at least as wide as the width of said magentic gap, (ii) one of opposite ends of said recess which is adjacent to said magnetic gap is spaced at least 0.5 μm away from said magnetic gap, (iii) the other one of opposite ends of said recess which is remote from said magnetic gap is spaced a maximum distance of 40 μm from said magnetic gap, and (iv) said recess has a depth of at least 0.1 μm.

2. A head core slider according to claim 1, wherein said recess has a depth of 0.5 μm–2 μm.

3. A head core slider according to claim 1, wherein said one of opposite ends of said recess which is adjacent to said magnetic gap is defined by an end wall which is inclined with respect to the magnetic gap, in a plane parallel to said upper surface of said slider body.

* * * * *